United States Patent
Bader et al.

[11] 3,903,169
[45] *Sept. 2, 1975

[54] PROCESS OF REACTING CYCLOPENTANONE WITH LACTONES

[75] Inventors: Henry Bader, Newton Center; Avinash C. Mehta, Belmont, both of Mass.

[73] Assignee: Polaroid Corporation, Cambridge, Mass.

[ * ] Notice: The portion of the term of this patent subsequent to Nov. 13, 1990, has been disclaimed.

[22] Filed: Aug. 27, 1973

[21] Appl. No.: 391,933

[52] U.S. Cl............................ 260/590; 260/343.5
[51] Int. Cl............................................ C07c 49/82
[58] Field of Search..................................... 260/590

[56] References Cited
UNITED STATES PATENTS
3,772,368  11/1973  Bader et al. ........................ 260/590

Primary Examiner—D. Horwitz
Attorney, Agent, or Firm—John P. Morley

[57] ABSTRACT

A process for preparing a silver halide developer of the following formula:

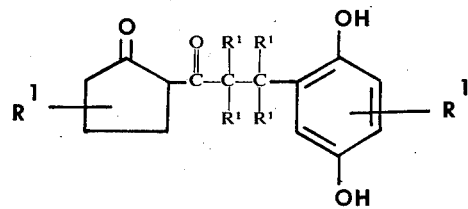

wherein $R^1$ represents a substituent which can be the same or different but which does not impair the functionality of the compound as a silver halide developer. Specific substituents include hydrogen, alkyl radicals and alkoxy radicals among others. Essentially, the process involves an improved condensation reaction between a cyclopentanone anion and a lactone to directly provide an intermediate which can be readily converted to the dye developer of formula 1.

12 Claims, No Drawings

3,903,169

PROCESS OF REACTING CYCLOPENTANONE WITH LACTONES

BACKGROUND OF THE INVENTION

Part 1. The Field of the Invention

This invention relates to photography. More precisely, the invention disclosed herein relates to a process for producing compounds which can be employed as silver halide developers but are especially useful as intermediates for providing metal complexed dyes employed in developing silver halide image patterns.

Part 2. Description of the Prior Art

Metallized dyes having a silver halide developing capability are known to the art. Essentially, such dyes may be defined as compounds having a moiety of the following formula:

$$Y - Z$$

FORMULA 2 bonded to the complexing atom and wherein Y is a radical comprising a silver halide developing substituent and Z is a ligand radical, i.e., a radical of a compound containing one or more coordinating or donor atoms for forming a metal complex.

More precisely, such metallized dyes can be illustrated schematically as follows:

DYE—ME—LIGAND DEVELOPER

FORMULA 3 wherein "DYE" is a chelatable dye, "ME" is a metal complexing atom, and "LIGAND DEVELOPER" is a substantially colorless ligand contributing at least one and preferably two of the coordinating or donor atoms necessary to form the desired complex and wherein the ligand contains a silver halide developing agent or substituent.

Chelatable dyes suitable as DYE in the above Formula 4 are known to the art and include among others, those providing the following structure with the complexing metal atom:

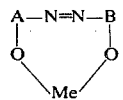

FORMULA 4 wherein A is an aromatic radical, e.g., a substituted or non-substituted phenyl or naphthyl radical; B is an aromatic or heterocyclic radical, e.g., a substituted or non-substituted phenyl, naphthyl or pyrazolene radical and

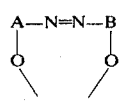

FORMULA 5 is the radical of an ortho, ortho' dihydroxy azo dye of the formula:

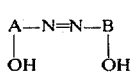

FORMULA 6 and Me is a metal complexing atom, e.g., a transition metal particularly a metal of the first transition series, i.e., chromium, copper, cobalt, nickel, iron, zinc, manganese, scandium, titanium and vanadium. Other useful metals such as aluminum, silver, palladium, and platinum will be apparent to those skilled in the art. Details relating to metallized dyes of the above described type can be found in commonly assigned U.S. Pat. 3,453,107, issued July 1, 1969 to Elbert M. Idelson.

Another class of chelatable dyes suitable as DYE in Formula 4 are those providing the following structure with the complexing metal atom:

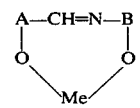

FORMULA 7 wherein A, B and Me are as defined above and

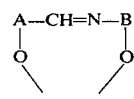

FORMULA 8 is the radical of an ortho, ortho' azomethine dye of the formula:

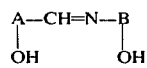

FORMULA 9

Details relating to metallized dyes containing this class of dye are described in commonly assigned applications Ser. No. 830,499, filed June 4, 1969 by Elbert M. Idelson now U.S. Pat. No. 3,597,200 and Ser. No. 830,480 filed June 4, 1969 by Arthur B. Goulston and Paul S. Huyffer now abandoned.

Ligand developers which qualify as a "LIGAND DEVELOPER" of Formula 3 are also known to the art. As mentioned, such ligand developers conform to Formula 2, e.g., $$Y - Z$$

where Y is a radical comprising a silver halide developing substituent and Z is a ligand radical. Specific classes of ligand developers can be defined by the following formulae:

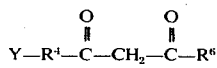

FORMULA 10

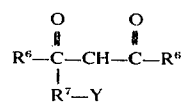

FORMULA 11

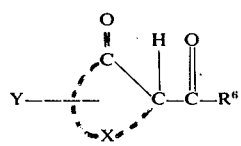

FORMULA 12

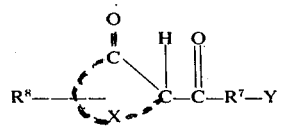

FORMULA 13 wherein: $R^4$ is an alkylene radical having from 1–6 carbon atoms or a substituent chosen from the group consisting of

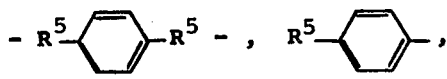

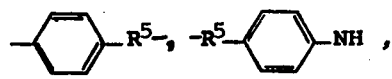

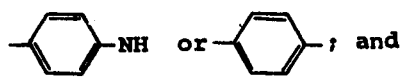

$R^5$ is an alkylene radical having from 1–6 carbon atoms;

each $R^6$ is hydrogen or an alkyl radical having from 1–6 carbon atoms;

each $R^7$ is an alkylene radical having from 1–6 carbon atoms; and $R^8$ is an alkyl radical having from 1–3 carbon atoms, an alkoxy radical having from 1–3 carbon atoms or H;

X represents the atoms necessary to complete a cyclopentane, cyclohexane or a benzene ring; and Y is ortho or paradihydroxyphenyl or a protected derivative thereof.

Additional details relating to the above described ligand developers can be found in commonly assigned U.S. Pat. application Ser. No. 881,323 filed Dec. 1, 1969 by Elbert M. Idelson.

Particularly useful metallized dyes of Formula 4 are those conforming to the following formulae:

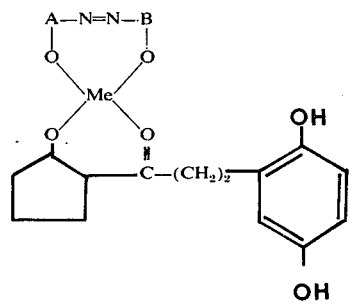

FORMULA 14

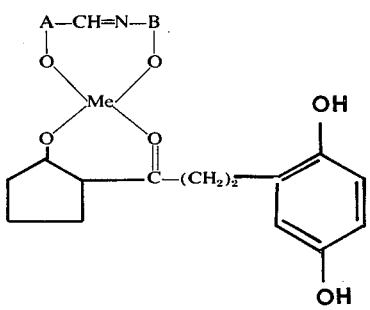

FORMULA 15 wherein it can be seen that both dyes have as their dye developing moiety, a compound of Formula 1, e.g.,

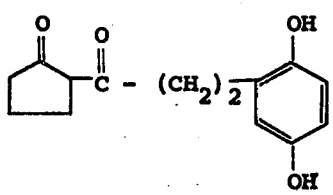

FORMULA 16

In the past, the most effective process for producing compounds of Formula 1 in the high yields desired involved close control over the saponification and acidification of a compound of the following formula:

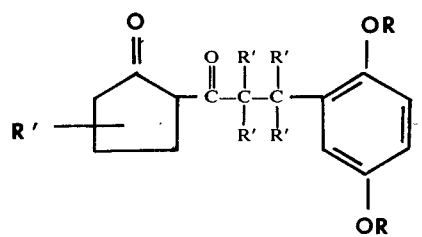

FORMULA 17 wherein R' is as defined before and R is a hydrolyzable ester group. Details relating to the above described method can be found in commonly assigned application Ser. No. 164,102 filed July 19, 1971 by Henry Bader, Edwin G. E. Jahngen and Michael Feingold now U.S. Pat. No. 3,812,191. In accordance with the method disclosed therein a compound of Formula 18 is prepared by way of a six step synthesis. An improved process for providing dye developers of Formula 17 by the acylation of Schiff base anions with lactones is disclosed in commonly assigned, copending application Ser. No. 163,998 filed July 19, 1971 by Henry Bader and Avinash C. Mehta now U.S. Pat. No. 3,772,368. The present process presents another method for preparing such dye developers and essentially involves an improved condensation reaction between a cyclopentanone and a lactone to directly provide an intermediate which can be easily converted to a compound of Formula 1.

SUMMARY OF THE INVENTION

The present invention essentially involves the acylation of cyclopentanone anions with specific lactones to directly provide a compound of Formula 1 which, as mentioned before, is as follows:

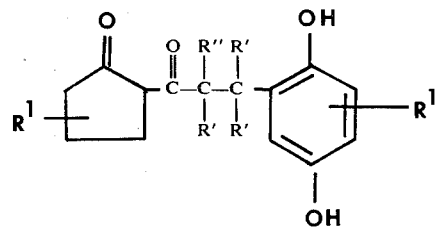

FORMULA 1 wherein, $R^1$ is a substituent which will not impair the functionality of the compound as a silver halide developing agent; each substituent can be the same or different and can be, for example, hydrogen, an alkyl radical—preferably lower alkyl, e.g., 1–6 carbon atoms—or an alkoxy radical—preferably lower alkoxy.

In accordance with the practice of the present invention, compounds of Formula 1 are prepared by way of the following representative sequence of reactions:

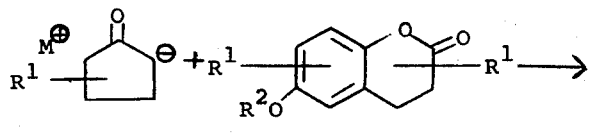

Cyclopentanone Anion      Lactone

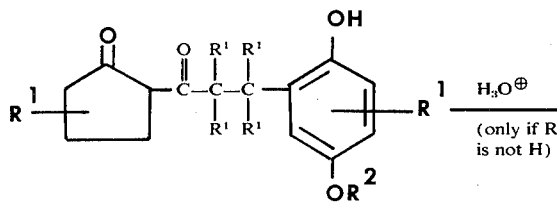

Formula 18

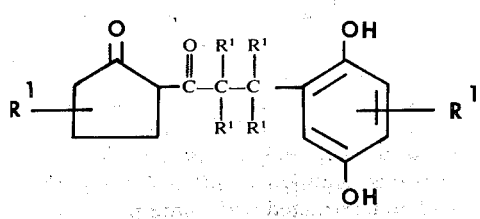

FORMULA 1 wherein, $R^1$ is as defined before and $R^2$ represents hydrogen or an easily removable solubilizing protective group.

As mentioned in the aforesaid U.S. application Ser. No. 163,998, the preliminary attempts at direct acylation of a cyclopentanone anion with such lactones provided low commercially impractical yields of product, e.g., less than 15%.

Accordingly, a condensation reaction between equimolar quantities of those reagents, would give upon hydrolysis as predominant products cyclopentanone and the corresponding β-arylpropionic acid. The low yield of the compound of Formula I and the presence of large quantities of cyclopentanone and the arylpropionic acids indicated that the main reaction between the cyclopentanone anion and lactones involved the O-acylation of cyclopentanone providing the following product before hydrolysis:

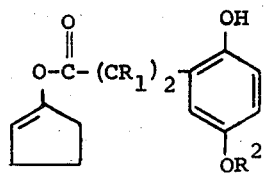

In accordance with the present invention, it has been found that the use of an excess of a cyclopentanone anion in the above described condensation reaction can provide yields which are about twice those or greater than the yields obtained with an equimolar ratio of the reagents. By an excess of cyclopentanone anion it is meant that the amount of cyclopentanone anion employed is at least about 1.2 times preferably about 2 times the amount of lactone involved in the reaction. It is believed that the excess cyclopentanone anion undergoes reaction with the O-acylated product to provide increased yields according to the following reaction scheme:

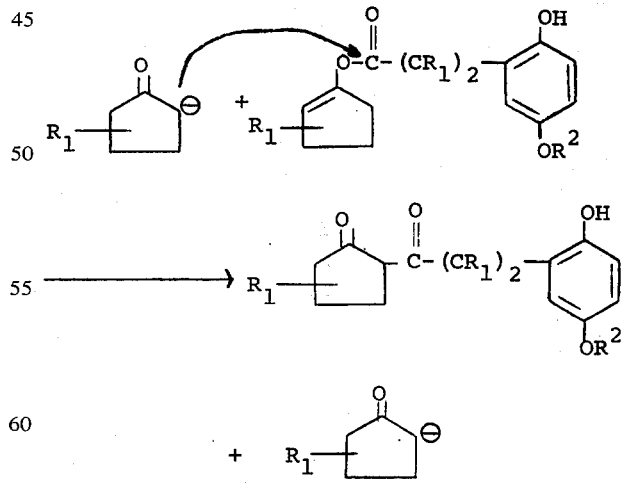

DETAILED DESCRIPTION OF THE INVENTION

The cyclopentanone anions involved in the above reaction sequence are prepared by deprotonating a cyclopentanone of the formula:

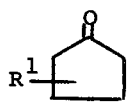

wherein R¹ is as defined before.

The particular reagent involved in "deprotonating" the cyclopentanone to provide the cyclopentanone anion is an important consideration in assuring a high degree of efficiency in the practice of the present process. Deprotonating reagents are known and they include metal hydrides, triarylmethane anions, metal methylsulfinylmethides and metal amides of secondary amines. In the preferred practice of the present invention metal amides of such secondary amines as dimethylamine, diethylamine and particularly the more hindered diisopropylamine are especially suitable. Accordingly, suitable deprotonating reagents include lithium diiosopropylamide or bromomagnesium diisopropylamide among others. The lithium diisopropylamide is especially preferred since it reacts faster and can produce good yields of deprotonated cyclopentanone anion products at or below room temperature. Bromo- or chloro-magnesium diisopropylamide require a short period of heating for the cyclopentanone anion formation but they may have a slight economic advantage over the lithium derivative. All these diisopropylamides can be formed in situ from diisopropylamine and either n-butyllithium or a Grignard reagent, such as ethylmagnesium chloride or bromide. The following reactions illustrate representative methods for producing cyclopentanone anions.

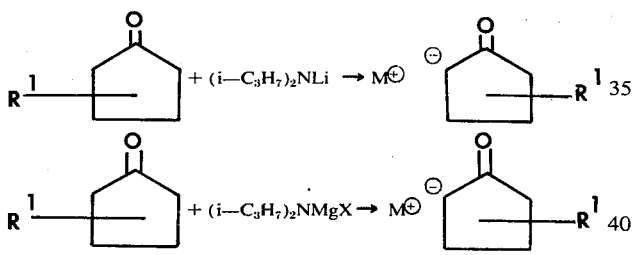

where, for example, M is Li, or MgX, and X is Cl or Br. An especially suitable solvent for the above reactions is tetrahydrofuran.

In the process of the present invention the cyclopentanone anion is reacted with a lactone conforming to the following formula:

LACTONE wherein R¹ is as defined before and R³ can be hydrogen or represents a solubilizing protective group which can be removed to provide the hydroxy group at this position. Especially preferred solubilizing groups are the tetrahydropyranyl radical,

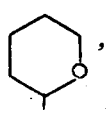

or alkoxymethyl radicals, e.g., the methoxymethyl radical, $CH_3OCH_2-$.

The reaction parameters involved in the condensation of the cyclopentanone anion and the lactones are not considered especially critical but those providing high yields will be apparent from the present disclosure. The solubility of the reactants in most solvents is somewhat low; but substantially equivalent yields were obtained when the reaction was carried out for about one hour under reflux using such solvents as tetrahydrofuran, dioxane or 1,2-dimethoxyethane. The time and temperature of the reaction are not considered critical since the condensation reaction can be conducted at low temperatures, e.g., −60°C., room temperature or at reflux temperatures and the time can vary from one half hour or less to 15 hours or more. Maximum yields, however, are usually obtained by refluxing the reactants for about one to about six hours.

In the above described reaction the condensation product conforms to the following formula or to tautomeric and isomeric forms thereof,

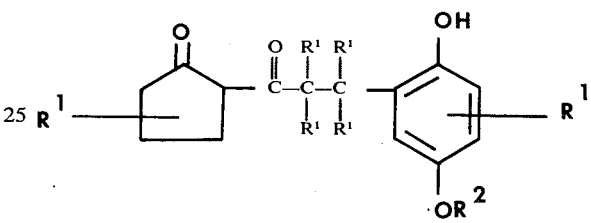

FORMULA 18 wherein R¹ and R² are as defined before. Hydrolysis of the condensation product of the above formula removes solubilizing protective groups, e.g., R² if present, to provide the product of Formula 1. This hydrolysis can be performed with various organic acids, such as acetic or formic acid, or inorganic acids such as hydrochloric or sulfuric acid. As especially preferred hydrolysis medium is a mixture of water, tetrahydrofuran and an organic acid such as formic acid.

The invention as well as manners of practicing same will be more fully appreciated by reference to the following illustrative Examples which relate to the preferred embodiments.

THE PREFERRED EMBODIMENTS OF THE INVENTION

EXAMPLE 1

The reaction was carried under nitrogen atmosphere with exclusion of moisture.

To a solution of 4.4 ml. (0.033 mole) of diisopropylamine in 10 ml. of tetrahydrofuran cooled to ice-bath temperature was added dropwise 13.5 ml (0.03 mole) hexane solution of n-butyllithium (2.28 molar) with stirring. This was followed by dropwise addition of a solution of 1.8 ml. (0.02 mole) of cyclopentanone in 5 ml. of tetrahydrofuran over a period of 10 minutes. After additional stirring for 5 minutes, a solution of 1.64 g. (0.01 mole) of 6-hydroxy-3,4-dihydrocoumarin in 30 ml. of tetrahydrofuran was added dropwise with stirring over 30 minutes and then the reaction mixture was allowed to stir at room temperature for 15 hours. Reaction mixture was acidified to pH 5–6 using 1N-hydrochloric acid and extracted with three portions of 25 ml. each of ethyl acetate. Combined extracts were washed with 4% aqueous sodium bicarbonate, followed by washing with a saturated sodium chloride solution and were dried over anhydrous sodium sulfate. Removal of solvent first on the rotary evaporator and then on the vacuum pump, gave 2.15 g. of an oil which analyzed by VPC for 33.66% content of deblocked ligand giving a content yield of 29.2%.

EXAMPLE 2

To a solution of 4 ml. (0.028 mole) of diisopropylamine in 10 ml. of tetrahydrofuran at ice-bath temperature was added dropwise with stirring 9 ml. (0.02 mole) of hexane solution of n-butyllithium (2.28 molar). This was followed by dropwise addition of a solution of 1.8 ml. (0.02 mole) of cyclopentanone in 5 ml. of tetrahydrofuran over 10 minutes. After stirring the reaction mixture for 5 additional minutes, a solution of the tetrahydropyranyl ether (obtained from 1.64 g. of 6-hydroxy-3,4-dihydrocoumarin) in 30 ml. of tetrahydrofuran was added dropwise with stirring over 30 minutes. The reaction mixture was stirred at room temperature for 18 hours, was acidified to pH 6.5 using 1N hydrochloric acid, and then heated on steam bath under reflux for 20 minutes with 5 ml. of formic acid. After dilution with 50 ml. of water, the pH was adjusted between 5 and 6 using solid sodium bicarbonate and then the solution was extracted with three 25 ml. portions each of ethyl acetate. The combined extracts were washed with a saturated sodium chloride solution and dried over anhydrous sodium sulfate. Removal of the solvent-first on the rotary evaporator and then on the vacuum pump gave 2.84 g. of an oil which analyzed by VPC for 34.5% content of deblocked ligand giving a content yield of 39.5%.

The crude ligand of Example 1 and 2 can be purified most effectively by using the alkali-extraction procedure described in the aforesaid U.S. Pat. application Ser. No. 163,998.

As can be seen from the above, commercially useful yields can be obtained by employing an excess of the cyclopentanone anion. As mentioned, the amount of cyclopentanone should be at least 1.2 times that of the lactone while an amount in the order of about 2 times that of the lactone is preferred. Amounts of cyclopentanone in excess of about 2.5 times that of the lactone can be employed but are not preferred.

Since certain changes can be made in many of the features of the above description and disclosure without departing from the spirit and scope of the invention defined in the appended claims, it is intended that all matters contained in the above description shall be interpreted as illustrative and not in a limiting manner.

What is claimed is:

1. A process which comprises the steps of
    a. reacting an excess of a cyclopentanone anion of the formula:

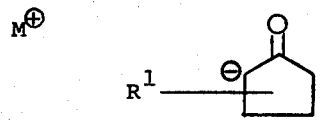

with a lactone of the formula:

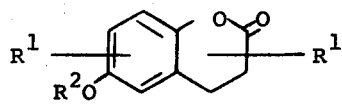

to provide a compound of the formula:

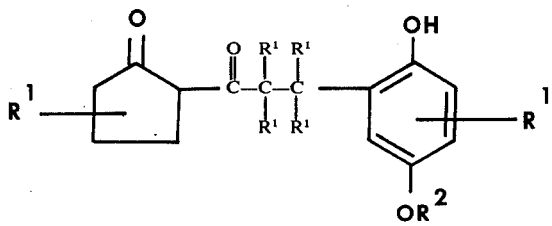

and,
    b. hydrolyzing the reaction product of step a. if $R^2$ is not hydrogen to provide a silver halide developing agent of the formula

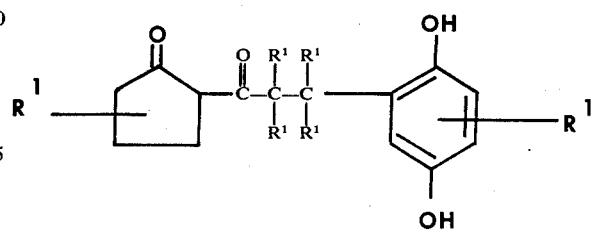

wherein, $R^1$ is a substituent selected from the group consisting of hydrogen, an alkyl radical or an alkoxy radical; $R^2$ is selected from the group consisting of hydrogen, an alkoxymethyl radical or a tetrahydropyranyl radical and M is selected from the group consisting of lithium or a magnesium halide.

2. A process of claim 1 wherein said cyclopentanone anion conforms to the formula

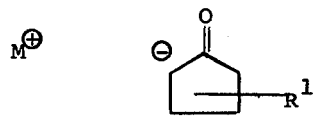

and $R^1$ is hydrogen, and M is Li or MgX where X is chlorine or bromine.

3. A process of claim 1 wherein said excess of cyclopentanone anion is an amount between about 1.2 to about 2.5 times the amount of lactone employed.

4. A process of claim 1 wherein M is Li.

5. A process of claim 1 wherein M is MgX.

6. A process of claim 1 wherein said lactone conforms to the formula:

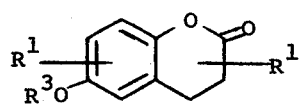

wherein $R^1$ is hydrogen and $R^3$ is hydrogen,

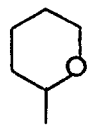

or $CH_3OCH_2$—.

7. A process of claim 6 wherein $R^3$ is hydrogen.
8. A process of claim 6 wherein $R^3$ is

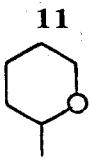

9. A process of claim 6 wherein R³ is CH₃OCH₂—.

10. A process which comprises the steps of (a) reacting a cyclopentanone anion of the formula

where M is Li, MgCl or MgBR with a lactone of the formula

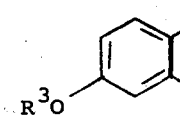

where R³ is hydrogen,

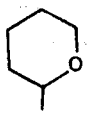

or CH₃OCH₂— to provide a compound of the formula

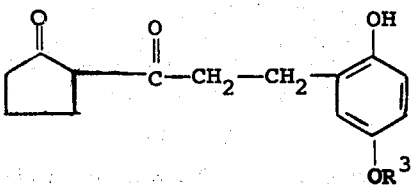

where the amount of said cyclopentanone anion is from about 1.2 to 2.5 times greater than the amount of lactone involved and (b) hydrolyzing the product of step (a) if R² is not hydrogen to provide a compound of the formula

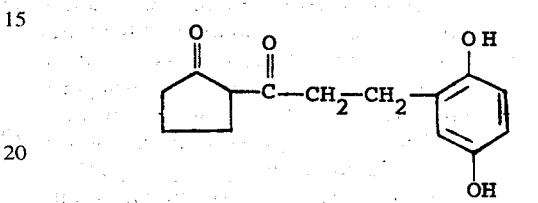

11. A process of claim 10 wherein M is Li.
12. A process of claim 10 wherein M is MgCl or MgBr.

* * * * *